United States Patent
Helland et al.

(10) Patent No.: US 9,327,698 B2
(45) Date of Patent: May 3, 2016

(54) TRACTOR PARK BRAKE FORCE SENSING SYSTEM

(75) Inventors: Chad Helland, Knoxville, TN (US); Marlin L. Goodnight, Martinez, GA (US); Andrew M. Smock, Grovetown, GA (US); Stephen M. Upchurch, Evans, GA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 13/458,309

(22) Filed: Apr. 27, 2012

(65) Prior Publication Data

US 2013/0289831 A1 Oct. 31, 2013

(51) Int. Cl.
*B60Q 1/00* (2006.01)
*B60T 13/66* (2006.01)
*B60T 17/18* (2006.01)
*B60T 17/22* (2006.01)

(52) U.S. Cl.
CPC .............. *B60T 13/662* (2013.01); *B60T 17/18* (2013.01); *B60T 17/22* (2013.01)

(58) Field of Classification Search
None
See application file for complete search history.

(56) References Cited

U.S. PATENT DOCUMENTS

| | | | |
|---|---|---|---|
| 4,374,554 A * | 2/1983 | Colpaert | 188/106 A |
| 6,997,521 B2 | 2/2006 | Jensen et al. | |
| 7,744,166 B2 * | 6/2010 | Leiter et al. | 303/20 |
| 2002/0003068 A1 * | 1/2002 | Sundqvist et al. | 188/72.9 |
| 2002/0075147 A1 * | 6/2002 | Stonehocker et al. | 340/453 |
| 2002/0184963 A1 * | 12/2002 | Champ et al. | 74/560 |
| 2003/0221922 A1 * | 12/2003 | Callow | 188/265 |
| 2006/0097569 A1 * | 5/2006 | Eberling et al. | 303/122.15 |
| 2007/0151401 A1 * | 7/2007 | Murase | 74/538 |
| 2008/0179144 A1 * | 7/2008 | Sommerfeld et al. | 188/33 |
| 2009/0038282 A1 * | 2/2009 | Avalle et al. | 56/10.8 |
| 2010/0295670 A1 * | 11/2010 | Sato et al. | 340/458 |
| 2012/0073894 A1 * | 3/2012 | Sprinkle et al. | 180/336 |

* cited by examiner

*Primary Examiner* — Jerrah Edwards
*Assistant Examiner* — Paul Castro

(57) ABSTRACT

A tractor park brake force sensing system includes a force sensor switch that is actuated if a tensile force applied to a linkage between a park brake lever and a park brake is adequate to compress a spring in the linkage a pre-specified amount as the park brake lever is moved to a park brake set position. A controller connected to the force sensor switch and to a tractor motion sensor turns on a solid indicator light if the force sensor switch is actuated, and flashes the indicator light if the park brake lever is moved to the park brake set position and the tractor motion sensor indicates the tractor is moving.

10 Claims, 2 Drawing Sheets

TRACTOR PARK BRAKE FORCE SENSING SYSTEM

FIELD OF THE INVENTION

This invention relates generally to a tractor park brake, and specifically to a tractor park brake force sensing system.

BACKGROUND OF THE INVENTION

In the past, small tractors have included circuits that provide an indicator to the operator, such as a solid light on the vehicle dash, if the operator sets the park brake. However, these circuits may turn on the solid indicator light even if the operator sets a park brake that is adjusted incorrectly and cannot hold the tractor in place, or if the operator sets the park brake while the tractor is moving.

Various interlock devices have been proposed to keep a tractor or other work vehicle from moving while the park brake is set. For example, U.S. Pat. No. 3,912,056 relates to a mechanical interlock activated by the park brake to restrict the operator's ability to apply the throttle pedal. Fuel supply interlocks also have been proposed for use with park brake systems to disable the fuel supply if the park brake is applied. For example, U.S. Pat. No. 4,295,540 relates to a vehicle brake and engine interlock that suppresses power output at the engine if the park brake is engaged, such as by adjusting the throttle valve of a carburetor to stall or shut down the engine. Other interlocks have been designed to prevent engagement or maintain or establish a neutral condition of a vehicle transmission while the park brake is engaged. For example, U.S. Pat. No. 4,051,915 relates to a neutral start and park brake safety tractor park brake force sensing system that stops current to the ignition coil if the transmission is engaged in forward or reverse while the park brake is also engaged. U.S. Pat. No. 6,886,677 relates to a mechanism that locks the forward and reverse pedals in a neutral position while the park brake is engaged. U.S. Pat. No. 6,279,937 relates to a neutral return mechanism that will place the transmission in neutral while the park brake is applied.

These interlock device, however, do not warn the operator if the park brake is adjusted incorrectly and cannot hold the vehicle in place. A tractor park brake force sensing system is needed that provides an indicator to the operator if the park brake can hold the vehicle in place, and warns the operator if the park brake is adjusted incorrectly and cannot hold the vehicle in place, or if the park brake is set or not released while the tractor is driven.

SUMMARY OF THE INVENTION

A tractor park brake force sensing system includes a park brake engagement switch actuated by moving a park brake lever to a park brake set position, a force sensor in a linkage between the park brake lever and park brake, and a force sensing switch actuated by applying a pre-specified force between the park brake lever and the park brake. A motion sensor indicates if the tractor is moving. A transmission control unit may be electrically connected to the park brake engagement switch, the force sensing switch, the motion sensor, and to an indicator light. The transmission control unit turns on a solid indicator light if the tractor is not moving, the park brake engagement switch is actuated, and the force sensing switch is actuated. The transmission control unit turns on a blinking indicator light if the tractor is moving and the park brake engagement switch is actuated The tractor park brake force sensing system provides an indicator to the operator if the park brake can hold the vehicle in place, and warns the operator if the park brake is adjusted incorrectly and cannot hold the vehicle in place, or if the park brake is set or not released while the tractor is driven.

DESCRIPTION OF THE PREFERRED EMBODIMENT

Figure 1:
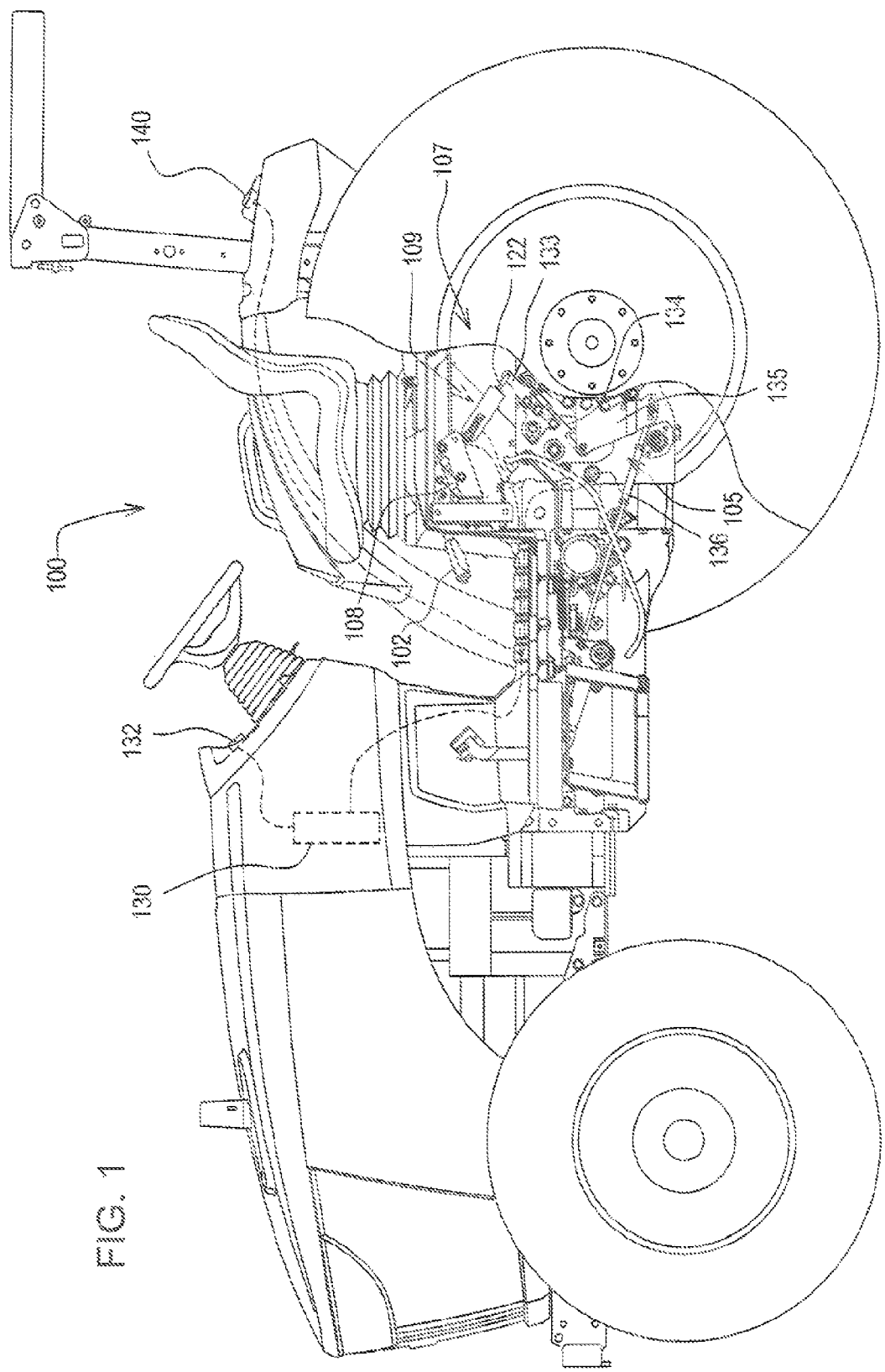
FIG. 1 is a side view of a compact utility tractor with a tractor park brake force sensing system according to a first embodiment of the invention.
Figure 2:
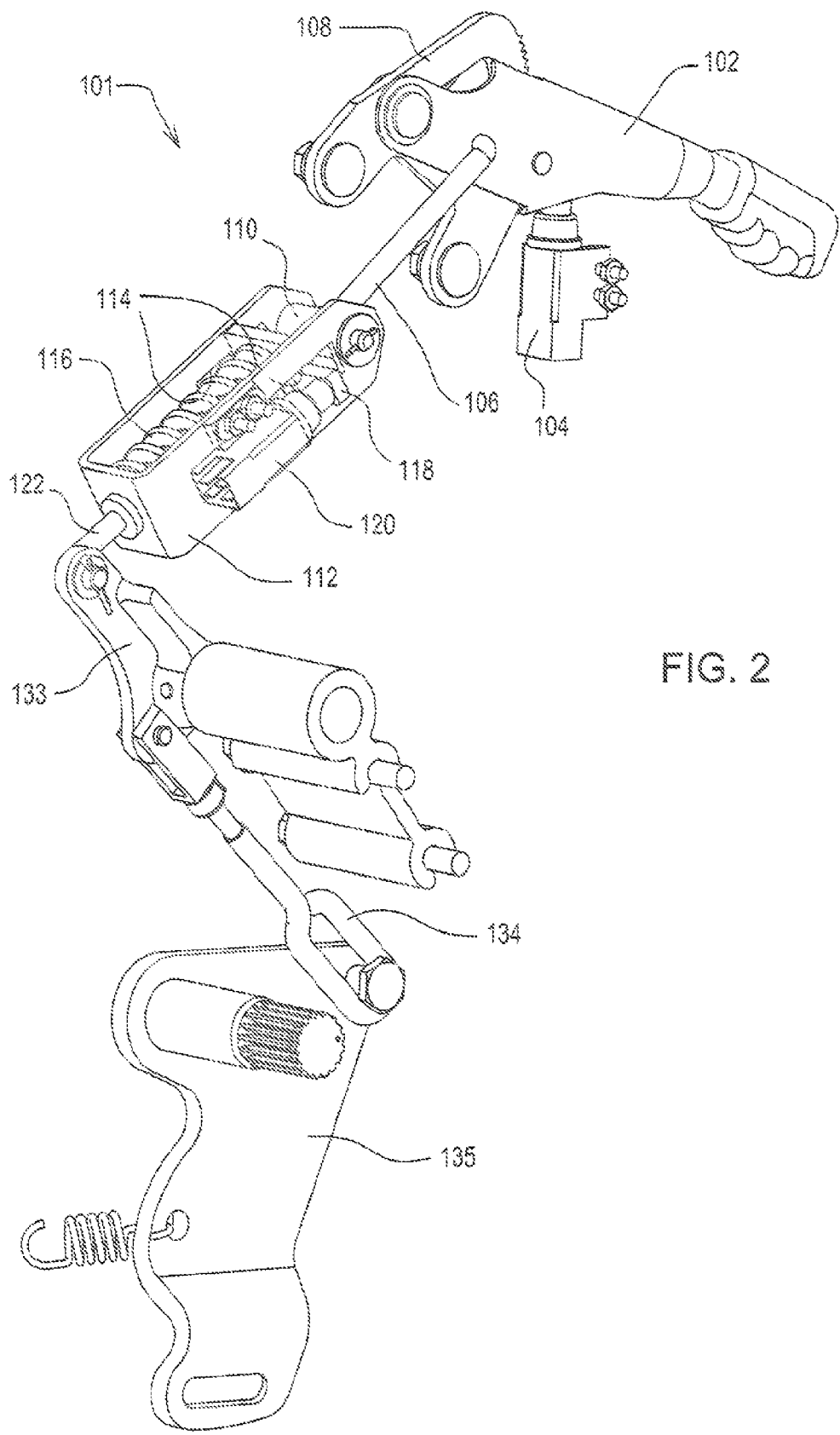
FIG. 2 is a perspective view of a tractor park brake force sensing system according to a first embodiment of the invention.

In a first embodiment shown in FIGS. 1-2, tractor park brake force sensing system 101 may include park brake lever 102 that an operator may move or pivot to a park brake set position to engage park brake 105 on compact utility tractor 100. The park brake lever may be mounted to park brake lever pivot bracket 108. A preferred embodiment includes a park brake lever, but the tractor park brake force sensing system of the present invention also may include and use a park brake pedal or other control to engage the park brake. For example, the park brake may include pivoting bell crank 133 connected by wire form 134 to pivoting brake actuator 135 to actuate a caliper ball and ramp parking brake mechanism. Alternatively, the park brake may include other brake actuation mechanisms that are commonly used on tractors.

In one embodiment, the tractor park brake force sensing system may include park brake engagement switch 104 mounted on or adjacent the park brake lever. The park brake engagement switch may be actuated when the operator moves or pivots the park brake lever to the park brake set position. The park brake engagement switch may be a momentary push button switch that may be shielded from moisture. The park brake engagement switch may provide an electrical signal to transmission control unit 130 if the operator moves the switch to the park brake set position.

In one embodiment, the tractor park brake force sensing system may include force sensor 109 in linkage 107 between the park brake lever and the park brake. The force sensor may indicate how much force is applied between the park brake lever and the park brake, and whether the force is at or above a pre-specified level that is adequate for the park brake to hold the tractor in place. For example, the pre-specified level of force may be a tensile force that is adequate for the park brake to hold the tractor in place on an 18% gradient hill.

In one embodiment, force sensor 109 may be a component in mechanical linkage 107 between the park brake lever and the park brake. The force sensor may be connected by rods 106 and 122 to the park brake lever and the park brake respectively. Alternatively, the force sensor may be connected by cables to either or both of the park brake lever and the park brake.

For example, force sensor 109 may be an assembly including spring 116 mounted in retainer 112. Rod 106 may be attached to a first end of the retainer, for example by cross member 110. The spring may be a coil spring positioned between a second end of the retainer and sliding member 118. Rod 122 may extend through the second end of the retainer and through the central axis of the spring, where the rod may be attached to the sliding member. The sliding member may slide within a pair of slots 114 in the sides of the retainer as the operator moves the park brake lever toward the park brake set position, compressing the spring as the operator applies tensile force between the park brake lever and park brake.

In one embodiment, the tractor park brake force sensing system may include force sensing switch 120 mounted on or adjacent the force sensor. The force sensing switch may be actuated when the operator moves the park brake lever to the park brake set position by applying sufficient force to compress the spring a specified distance. For example, a spring with a spring constant of about 300 lbs/inch may be compressed about 2 inches to provide a force of about 600 lbf in linkage 109. Such a force in linkage 109 may be used to apply a stopping torque of about 300 Nm at the brake actuators, or about 4000 Nm at the tractor axles, to hold a tractor stationary on an 18% gradient. The force sensing switch may be a momentary push button switch that may be shielded from moisture. The park brake engagement switch may provide an electrical signal to transmission control unit 130 if the force is at least the specified level.

In one embodiment, the tractor park brake force sensing system may include transmission control unit 130. The transmission control unit may be electrically connected to the park brake engagement switch and the force sensing switch, to one or more indicator lights 132 on the tractor dash, and also to a motion sensor such as speed sensor 136 in the transmission case that provides electrical signals to the transmission control unit indicating if the tractor is moving. For example, the speed sensor may be a Hall effect sensor that indicates if a transmission gear, shaft or wheel is turning. Alternatively, other motion sensors such as a wheel encoder that detects and indicates tractor movement may be used instead of a Hall effect speed sensor. The transmission control unit may include a microprocessor having hardware and/or software that performs the functions described in the paragraph below. Alternatively, another electrical circuit or controller may perform these functions instead of the transmission control unit.

In one embodiment, the transmission control unit may turn on a solid indicator light 132 if the motion sensor indicates the tractor is stopped, the park brake engagement switch is actuated, and the force sensing switch is actuated. The solid indicator light provides visual confirmation to the operator that the park brake is safely engaged. The transmission control unit may not turn on any indicator light if the motion sensor indicates the tractor is stopped, the park brake switch is actuated, but the force sensing switch is not actuated. The absence of an indicator light provides visual confirmation to the operator that the park brake is not safely engaged, either because the operator did not apply adequate force to the park brake lever, or because the park brake is adjusted incorrectly. The transmission control unit may turn on a blinking indicator light 132 if the motion sensor indicates the tractor is moving and the park brake engagement switch is actuated, regardless of the position of the force sensing switch. The blinking indicator light provides visual confirmation to the operator that the park brake is engaged while the tractor is moving, which may cause brake wear.

In one embodiment, the tractor park brake force sensing system also may be used along with a hitch assist function that an unseated operator may operate using controls 140 to move the tractor at very slow speeds to engage a hitch or implement. More specifically, the controller allows use of the hitch assist function after the motion sensor indicates the tractor is stopped, the park brake engagement switch is actuated, and the force sensing switch is actuated. The solid indicator light is turned on. The controller does not allow use of the hitch assist function after the motion sensor indicates the tractor is stopped, the park brake engagement switch is actuated, but the force sensing switch is not actuated. The absence of an indicator light provides visual confirmation that the park brake is not safely engaged, so the hitch assist function cannot be used. The controller also does not permit activation of the hitch assist function if the motion sensor indicates the tractor is moving.

Having described a preferred embodiment, it will become apparent that various modifications can be made without departing from the scope of the invention as defined in the accompanying claims.

The invention claimed is:

1. A tractor park brake force sensing system, comprising:
   a park brake engagement switch actuated by moving a park brake lever to a park brake set position;
   a force sensor in a linkage between the park brake lever and a park brake; the force sensor including a spring that compresses according to a tensile force between the park brake lever and park brake when the park brake lever is in the park brake set position;
   a force sensing switch actuated if the tensile force between the park brake lever and the park brake is sufficient to urge a retainer around the spring into engagement with the force sensing switch while the park brake lever is in the park brake set position;
   a motion sensor indicating if the tractor is moving; and
   a transmission control unit electrically connected to the park brake engagement switch, the force sensing switch, and the motion sensor, and to a solid or blinking indicator light;
   the transmission control unit turning on the solid indicator light if the tractor is not moving, the park brake engagement switch is actuated while the force sensing switch also is actuated; and the transmission control unit turns on the blinking indicator light if the tractor is moving and the park brake engagement switch is actuated.

2. The tractor park brake force sensing system of claim 1, wherein the park brake engagement switch and the force sensing switch are push button switches.

3. The tractor park brake force sensing system of claim 1, further comprising a hitch assist function that an unseated operator may use to move the tractor at slow speeds to engage a hitch or implement, the transmission control unit allowing use of the hitch assist function only after the motion sensor indicates the tractor is stopped, the park brake engagement switch is actuated, and the force sensing switch is actuated.

4. A tractor park brake force sensing system, comprising:
   a force sensor switch that is actuated if a tensile force applied to a linkage between a park brake lever and a park brake is adequate to compress a spring in the linkage sufficiently to move a spring retainer into contact with the force sensor switch as the park brake lever is moved to a park brake set position to actuate a park brake engagement switch; and
   a controller connected to the force sensor switch and to a tractor motion sensor; the controller turning on a solid indicator light if the force sensor switch is actuated while the park brake engagement switch also is actuated, and flashing the indicator light if the park brake lever is moved to the park brake set position and the tractor motion sensor indicates the tractor is moving.

5. The tractor park brake force sensing system of claim 4, wherein the park brake lever is connected by a rod to a retainer where the spring is positioned, and the park brake is connected to a rod extending through the spring.

6. The tractor park brake force sensing system of claim 5 wherein the force sensor switch is mounted on the side of the retainer.

7. A tractor park brake force sensing system, comprising:
a linkage between a park brake lever and a park brake, the linkage including a force sensor having a coil spring that is compressed responsive to a tensile force through the linkage to the park brake when the park brake lever is in an engaged position;
a force sensing switch on the force sensor that is actuated by a retainer around the coil spring if the tensile force reaches a pre-specified level that is adequate to hold the tractor in place; and
an indicator light on the tractor that is turned on if the force sensing switch is actuated while a park brake engagement switch also is actuated by the park brake lever.

8. The tractor park brake force sensing system of claim 7, further comprising a transmission control unit that is electrically connected to the force sensing switch, the park brake engagement switch, and a motion sensing switch, and that turns on a blinking light if the park brake engagement switch and the motion sensing switch are both actuated.

9. The tractor park brake force sensing system of claim 7, further comprising a hitch assist system having forward and reverse controls that may be operated by an unseated operator only if the force sensing switch and the park brake engagement switch are actuated.

10. The tractor park brake force sensing system of claim 7, wherein the force sensor includes a spring mounted in a retainer.

* * * * *